(No Model.)
M. L. TOLBERT.
SHEARS.
No. 450,877. Patented Apr. 21, 1891.
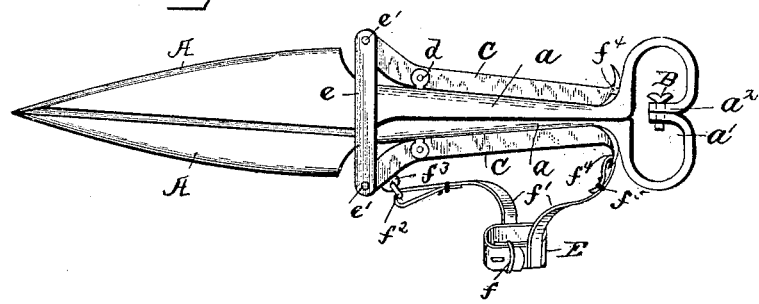
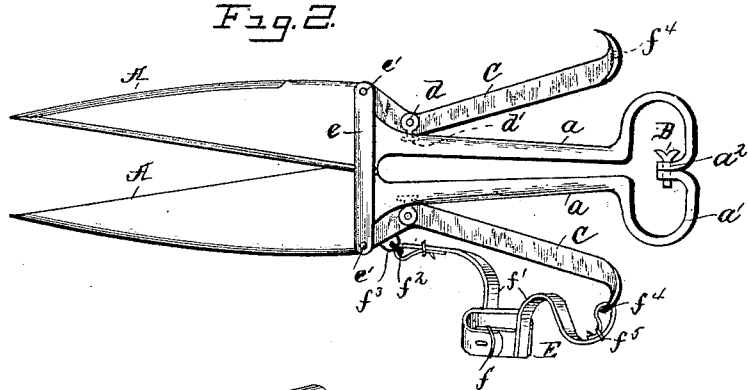
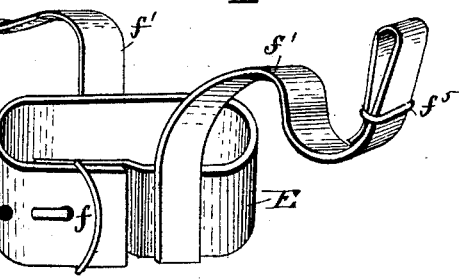
Witnesses
Wm. S. Hodges
Dan'l A. McElrick
Inventor
Martin L. Tolbert
By Patrick O'Farrell
Attorney

UNITED STATES PATENT OFFICE.

MARTIN L. TOLBERT, OF FORT SHAW, MONTANA.

SHEARS.

SPECIFICATION forming part of Letters Patent No. 450,877, dated April 21, 1891.

Application filed July 3, 1890. Serial No. 357,686. (No model.)

*To all whom it may concern:*

Be it known that I, MARTIN L. TOLBERT, a citizen of the United States of America, residing at Fort Shaw, in the county of Cascade and State of Montana, have invented certain new and useful Improvements in Shears, of which the following is a specification, reference being had therein to the accompanying drawings.

This invention pertains to shears, having relation more especially to sheep-shears; and it has for its object to enable easy operation, to prevent the shears from bucking, to procure accuracy and rapidity of action, to permit of the ready separation of the shears for easy and convenient sharpening thereof, and to provide a support or connection with the wrist of the operator.

The invention comprises the detail construction, combination, and arrangement of parts, substantially as hereinafter fully set forth, and particularly pointed out in the claims.

In the accompanying drawings, Figure 1 is a view in side elevation, showing the shears closed. Fig. 2 is a similar view with the shears opened. Fig. 3 is a vertical sectional view on the line $x\ x$, Fig. 1. Fig. 4 is a detail.

Referring to the drawings, A A designate the shears or blades, and $a$ the shanks thereof, having a loop connection, forming a jaw-opening spring $a'$. This loop or spring is formed by rigidly connecting the inner parallel ends $a^2$ of each shank by a thumb-screw B. By this arrangement the blades can be readily separated, so as to be separately sharpened.

C C designate two hand-levers, which are pivotally mounted near their forward ends in outwardly-projecting forked ears or lugs $d$, which are riveted to the shanks by their heads $d'$, as shown. In this manner the parts are countersunk and kept from unnecessarily protruding, and the edges of the levers will conform to the shanks. The forward ends of these levers C terminate in front of the ends of the shanks and at the heels of the blades or shears, and their rear ends are extended to form hand-grips or handles. The blades are embraced at each side by parallel links $e$, and the opposite ends of these links are pivoted, as at $e'$, to the forward ends of the levers. The links maintain the blades or shears in close relation to each other and prevent a lateral spreading, or what is commonly called "bucking."

E is a band or cuff designed to be adjustably secured on the wrist of the operator by a buckle $f$. From this band or cuff project two straps $f'$, one of which is connected by a link $f^2$ to a lug or ear $f^3$ of either lever C, and the other strap is passed through a slot or opening $f^4$ in the outer flattened end of such lever and is adjustable by a buckle $f^5$. This support or connection for the shears prevents the animal from knocking or kicking the same from the hands of the operator and serves as a support for the wrist and prevents all straining thereof.

I claim as my invention—

1. The herein-described improved shears having the adjustable band or cuff and the adjustable straps connecting the same to the shears, substantially as set forth, said cuff being arranged adjacent to the shanks of the shears, as stated.

2. The combination, with the shears having a hand-lever provided with a lug and a slot at opposite ends, of the band or cuff and the adjustable straps connected thereto and engaging said lug and slot, substantially as set forth.

3. The combination, with opposite shear-shanks, each provided with a bearing-ear, of opposite levers pivotally mounted on said ears and extended in rear of their pivots to form hand-grips or handles, and a link pivotally connecting the levers at their forward ends and in front of their pivots, substantially as set forth.

4. The combination, with the opposite shanks provided with opposite bearing-ears, of oppositely-pivoted operating-levers extended in rear of their pivots to form hand-grips, and opposite links pivoted at their ends to the forward ends of the levers and embracing the opposite shear-blades and serving to maintain them in contact with each other, substantially as set forth.

In testimony whereof I affix my signature in presence of two witnesses.

MARTIN L. TOLBERT.

Witnesses:
W. F. MARTIN,
G. P. AHERN.